(12) United States Patent
Kull

(10) Patent No.: US 7,068,466 B2
(45) Date of Patent: Jun. 27, 2006

(54) SPINDLE MOTOR FOR HARD DISK DRIVES

(75) Inventor: Andreas Kull, Donaueschingen (DE)

(73) Assignee: Minebea Co., Inc. (JP)

( * ) Notice: Subject to any disclaimer, the term of this patent is extended or adjusted under 35 U.S.C. 154(b) by 215 days.

(21) Appl. No.: 10/308,045

(22) Filed: Dec. 2, 2002

(65) Prior Publication Data

US 2003/0112551 A1   Jun. 19, 2003

(30) Foreign Application Priority Data

Dec. 5, 2001   (DE) ............... 201 19 716 U

(51) Int. Cl.
*G11B 17/02* (2006.01)
(52) U.S. Cl. .................................. 360/99.08
(58) Field of Classification Search ............ 360/98.07, 360/99.04, 99.08; 310/67 R, 90, 91
See application file for complete search history.

(56) References Cited

U.S. PATENT DOCUMENTS

| | | | |
|---|---|---|---|
| 5,847,479 A * | 12/1998 | Wang et al. | 310/90 |
| 6,339,273 B1 * | 1/2002 | Higuchi | 310/91 |
| 6,501,617 B1 * | 12/2002 | Harada et al. | 360/99.08 |
| 6,512,316 B1 * | 1/2003 | Obara et al. | 310/90 |
| 6,512,654 B1 * | 1/2003 | Teshima | 360/99.08 |
| 6,700,256 B1 * | 3/2004 | Fukutani et al. | 310/90 |
| 6,707,640 B1 * | 3/2004 | Nishio et al. | 360/99.08 |
| 2002/0047390 A1 * | 4/2002 | Aoki et al. | 310/90 |
| 2002/0047392 A1 * | 4/2002 | Obara | 310/90 |

FOREIGN PATENT DOCUMENTS

| | | |
|---|---|---|
| DE | 199 18 468 C2 | 11/2000 |
| DE | 100 26 467 A1 | 12/2001 |
| JP | 05-225537 | 9/1993 |
| JP | 09-009541 | 1/1997 |
| JP | 2001-057013 | 2/2001 |

OTHER PUBLICATIONS

Japanese Search Report dated Oct. 4, 2005.

* cited by examiner

*Primary Examiner*—Angel Castro
(74) *Attorney, Agent, or Firm*—Schulte Roth & Zabel, LLP; Joel E. Lutzker; Anna Vishev

(57) ABSTRACT

A spindle motor for use in hard disk drives having a base plate, a stationary shaft, a rotationally driven rotor, and a bearing system rotationally supporting the rotationally driven rotor. The shaft is fixedly mounted on the base plate. The base plate includes a drilled hole for insertion of a portion of the shaft such that this shaft's portion and the inner surface of the hole define a joint length l, when this portion is pressed into the drilled hole. The shaft has at least one notch located along the shaft's circumference and interrupting the joint length l.

8 Claims, 2 Drawing Sheets

SPINDLE MOTOR FOR HARD DISK DRIVES

CROSS-REFERENCE TO RELATED APPLICATIONS

This application claims all rights of priority to German Patent Application Ser. No. 201 19 716.2, filed Dec. 5, 2001 (pending).

BACKGROUND

The invention relates to a spindle motor for memory devices such as hard disk drives.

Conventional spindle motors for hard disk drives include a base plate or a base flange, a shaft, and a bearing system for rotationally supporting a motor's rotor driven by an electromagnetic force. The bearing system may be structured as a rolling bearing system or a hydrodynamic sliding bearing system.

In a conventional spindle motor having a stationary shaft, the shaft is firmly connected to the base plate or the base flange by means of a press-fit connection. To accomplish the connection, the base plate or the base flange features a drilled hole of a predetermined diameter and a predetermined length. One end of the shaft is pressed into and secured within the drilled hole. The outside diameter of the shaft is typically slightly larger than the inside diameter of the drilled hole of the base plate. This surplus is selected so as to ensure a minimal adhesive dimension, i.e., a certain adhesive strength, along the entire length of the joint. On the other hand, the surplus is selected to ensure that a maximum adhesive dimension is not exceeded. An excessive surplus would lead to an unacceptable strain on the components.

The greater the surplus and joint length, the higher is the press-in force required to join together the base plate and shaft. If the surplus or the joint length is reduced, adhesive strength may become too small. Increasing the surplus or joint length may result in damage to the components during the press-in procedure.

BRIEF SUMMARY

In general, in a first aspect, the invention features a spindle motor for use with hard disk drives having a base plate, a stationary shaft, a rotationally driven rotor, and a bearing system rotationally supporting the rotationally driven rotor. The shaft is fixedly mounted on the base plate. The base plate includes a drilled hole for insertion of a portion of the shaft such that this shaft's portion and the inner surface of the hole define a joint length l, when this portion is pressed into the drilled hole. The shaft has at least one notch located along the shaft's circumference and interrupting the joint length l.

The provided construction of the spindle motor results in the reduced press-in force needed to insert the shaft into the drilled hole in the base plate. This is attributable to the fact that the effective joint length is shortened by the notch in the shaft, and that the shaft and base plate are only connected in the two joint segments above and below the notch.

Nevertheless, a very favorable retention effect and a firm press fit of the shaft in the base plate can be achieved, since a larger surplus can be used in the remaining joint segments.

Consequently, the shaft can be connected to the base plate in a manner that is less damaging to the components.

In a preferred embodiment of the invention, the outer diameter of the shaft in proximity to the notch is substantially smaller than the inner diameter of the drilled hole in the base plate. Consequently, the shaft does not contact the inside wall of the drilled hole in the base plate in the area surrounding the notch, and no adhesive forces are created in this area. This facilitates the insertion of the shaft.

The notch preferably continues along at least half of the joint length, which nevertheless makes it possible to achieve a sufficiently firm connection.

Production of the notched shaft requires only a minimal increase in cost when compared with the production of a conventional shaft. The notched shaft may be made by being turned on a lathe, and is subsequently ground to size with a high degree of precision. Any existing chips or burrs in the transition area between the outer diameter and the point of insertion are eliminated by the polishing process.

The invention provides a design of a spindle motor for hard disk drives, where a small amount of press-in force is needed to join together the shaft and the base plate, but where a high degree of adhesive force is also achieved.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Figure 1:
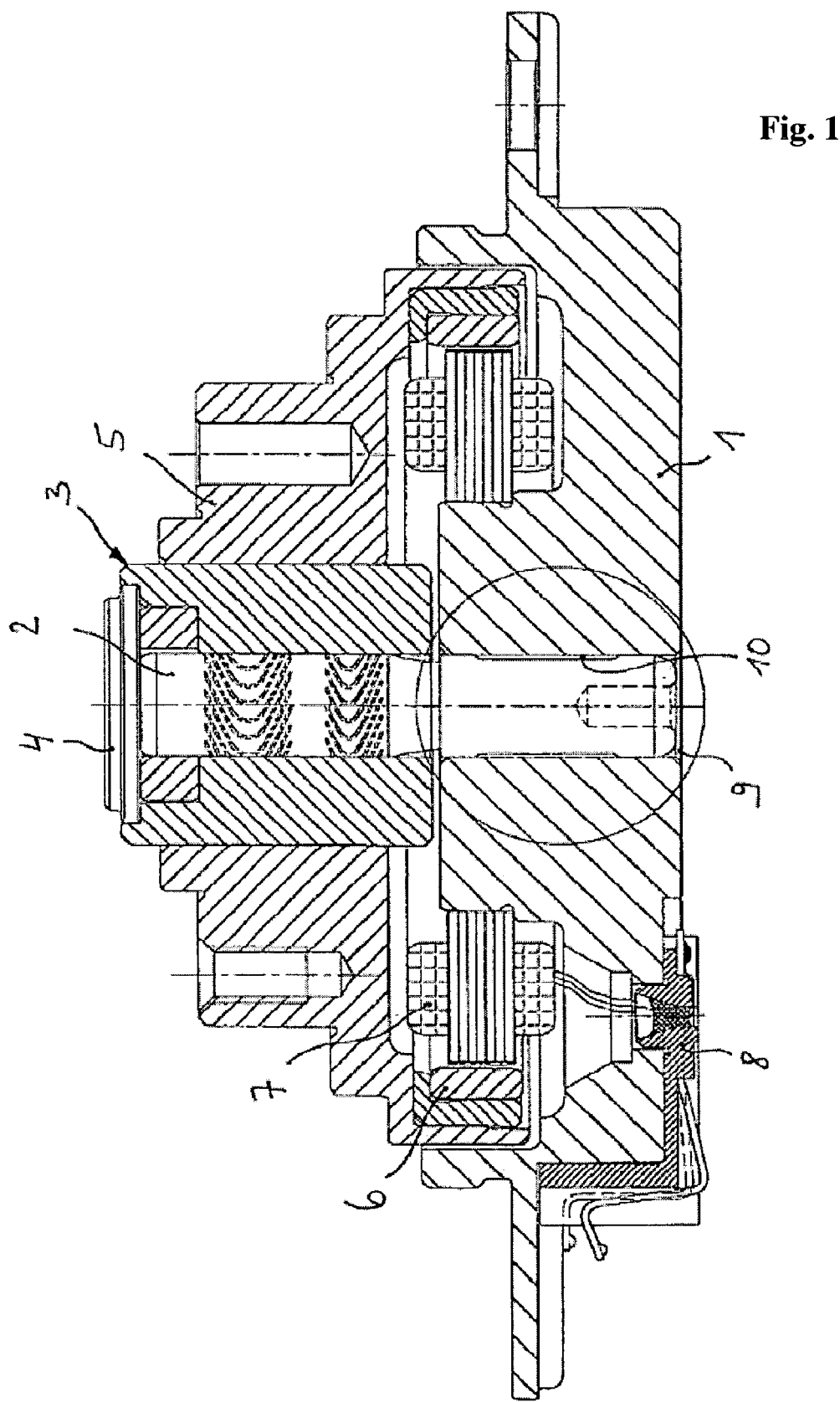
FIG. 1 is a cross-sectional view of a spindle motor for hard disk drives constructed in accordance with the preferred embodiment of the present invention.

As shown in FIG. 1, in accordance with the preferred embodiment of the present invention, a spindle motor is provided having a base plate 1 and a shaft 2 firmly connected to the base plate. A rotor 5 is rotationally mounted on shaft 2 by means of a bearing system 3, preferably structured as a hydrodynamic sliding bearing system. Bearing system 3 is protected from the exterior by a lid 4. Rotor 5 is equipped with rotor magnets 6 located along rotor's inner circumference. Rotor magnets correspond to a plurality of electrical coils located on a fixed stator 7 arranged on the base plate 1. Rotor 5 is actuated by an alternating electric field generated by the electrical coils interacting with the rotor magnets. A contacting unit 8 is provided to supply an electrical current to the electrical coils of stator 7.

Figure 3:
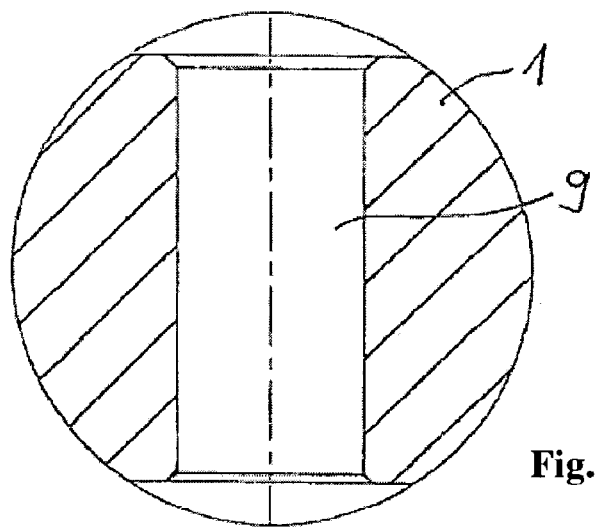
FIG. 3 is an enlarged cross-sectional view of the drilled hole of the base plate.

As shown in FIG. 3, base plate 1 features a cylindrical drilled hole 9 with a predetermined constant inner diameter. One end of shaft 2 is accepted in a forced fit into the cylindrical hole 9. An outer diameter of shaft 2 is slightly larger than the inner diameter of the cylindrical drilled hole, so that the shaft's end is frictionally and fixedly engaged in base plate 1 once the components have been joined together.

Figure 2:
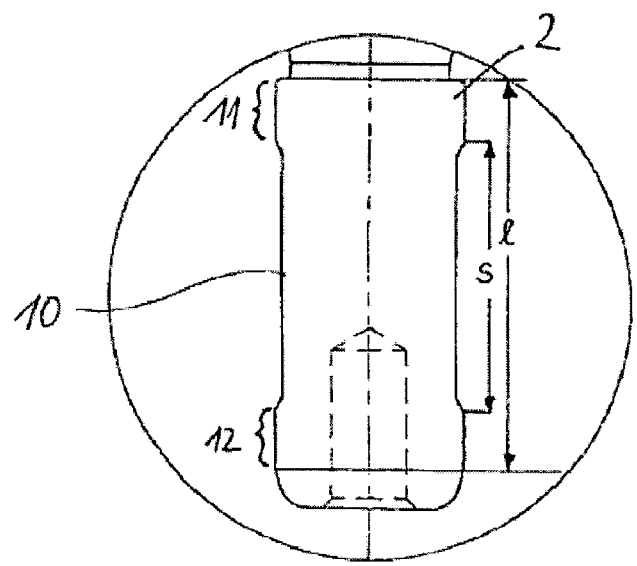
FIG. 2 is an enlarged cross-sectional view of the end of the shaft to be connected to the base plate, in accordance with the preferred embodiment of the present invention.

As shown in FIGS. 1 and 2, the theoretical length l of the joint between the cylindrical hole 9 and the shaft's end is, according to the invention, interrupted by a notch 10, effectively creating an upper joint segment 11 and a lower joint segment 12. The outer diameter of shaft 2 within the boundaries of the notch is substantially smaller than the predetermined outer diameter of the upper and lower joint segments. The outer diameter of the notch is likewise substantially smaller than the inner diameter of the cylindrical drilled hole 9. Thus, the effective length of the shaft-base joint is shortened by the notch in the shaft resulting in the shaft and base plate being only connected in the two joint segments above and below the notch.

In one preferred embodiment, the length s of notch 10 corresponds to approximately half of the theoretical joint length l. In another, most preferred embodiment, the length s is preferably greater than half of the joint length l.

Figure 4:
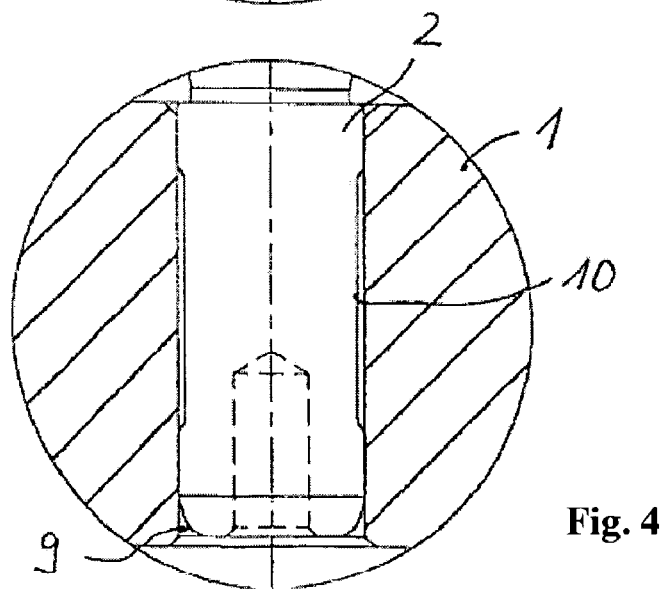
FIG. 4 is an enlarged cross-sectional view of the formed press-fit connection between the end of the shaft and the base plate, in accordance with the preferred embodiment of the present invention.

As shown in FIG. 4, when the shaft's end is pressed into the drilled hole 9 of the base plate 1, the press fit connection is established only along the upper and lower joint segments (11 and 12). No adhesive connection is formed in the area surrounding notch 10.

When a spindle motor is constructed in accordance with the present invention, the amount of force needed to complete the press-in process is greatly reduced, while the strength of the joint connection remains virtually unchanged. Nevertheless, a very favorable retention effect and a firm press fit of the shaft in the base plate can be achieved, since a larger surplus can be used in the remaining joint segments.

In accordance with the present invention, the notched shaft may be made by being turned on a lathe, and is subsequently ground to size with a high degree of precision. Any existing chips or burrs in the transition area between the outside diameter and the point of insertion may be eliminated by a polishing process.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A spindle motor for use in hard disk drives comprising:
a base plate;
a shaft;
a rotationally driven rotor; and
a bearing system rotationally supporting said rotationally driven rotor, wherein said shaft is fixedly mounted on said base plate, wherein said base plate comprises a hole for insertion of a portion of said shaft, said portion of said shaft and said hole defining a joint length l when said portion is pressed into said hole; and wherein said portion of said shaft further comprises a notch located along a circumference of said portion of said shaft and extending from the center of said portion of said shaft defining a length s interrupting said joint length l.

2. The spindle motor according to claim 1, wherein said hole further comprises an inner diameter, wherein said portion of said shaft further comprises an outer diameter, and wherein said outer diameter of said portion of said shaft in the area of said notch is significantly smaller than said inner diameter of said hole.

3. The spindle motor according to claim 2, wherein said length s of said notch is at least half of said joint length l.

4. The spindle motor according to claim 1, wherein said length s of said notch is at least half of said joint length l.

5. A hard disk drive having a spindle motor, said spindle motor comprising:
a base plate;
a shaft;
a rotationally driven rotor; and
a bearing system rotationally supporting said rotationally driven rotor, wherein said shaft is fixedly mounted on said base plate, wherein said base plate comprises a hole for insertion of a portion of said shaft, said portion of said shaft and said hole defining a joint length l when said portion is pressed into said hole; and wherein said portion of said shaft further comprises a notch located along a circumference of said portion of said shaft and extending from the center of said portion of said shaft defining a length s interrupting said joint length l.

6. The hard disk drive according to claim 5, wherein said hole further comprises an inner diameter, wherein said portion of said shaft further comprises an outer diameter, and wherein said outer diameter of said portion of said shaft in the area of said notch is significantly smaller than said inner diameter of said hole.

7. The hard disk drive according to claim 6, wherein said length s of said notch is at least half of said joint length l.

8. The hard disk drive according to claim 5, wherein said length s of said notch is at least half of said joint length l.

* * * * *